March 6, 1934.  E. L. DUNN  1,949,788
ELEVATOR CONTROL
Filed July 13, 1932  2 Sheets-Sheet 1

Edward Lee Dunn INVENTOR
BY Walter E. Bradley ATTORNEY

March 6, 1934.     E. L. DUNN     1,949,788
ELEVATOR CONTROL
Filed July 13, 1932     2 Sheets-Sheet 2
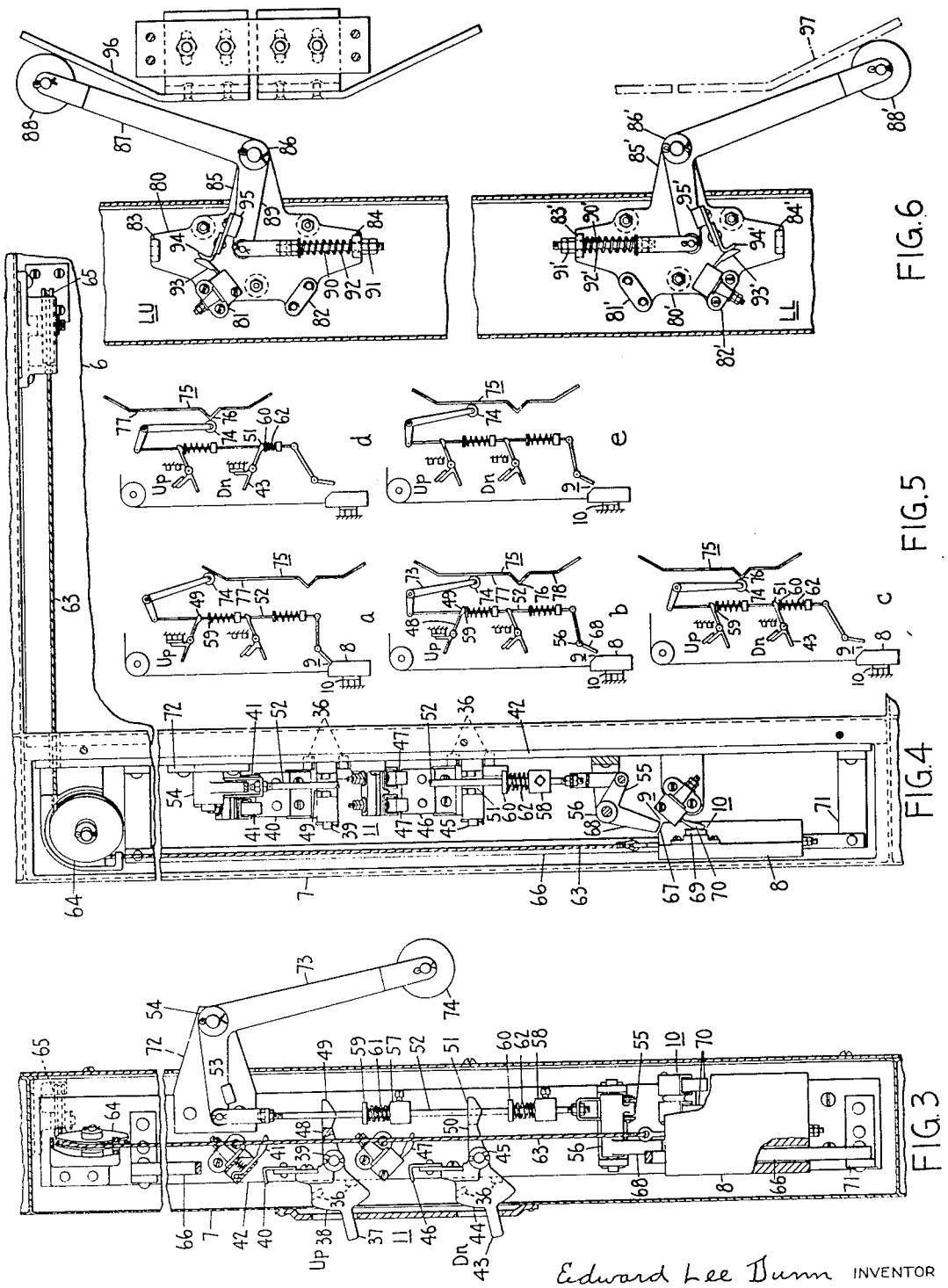
Edward Lee Dunn INVENTOR
BY Walter E. Bradley ATTORNEY Patented Mar. 6, 1934

1,949,788

UNITED STATES PATENT OFFICE 1,949,788

ELEVATOR CONTROL

Edward Lee Dunn, Montclair, N. J., assignor to Otis Elevator Company, New York, N. Y., a corporation of New Jersey Application July 13, 1932, Serial No. 622,202

15 Claims. (Cl. 187—29)

This invention relates to improvements in power dumbwaiter systems, useful, for example, in apartment houses.

Many of the modern apartment houses that are equipped with power driven conveniences have nevertheless been equipped with old-type hand power dumbwaiters, in view of the relative complexity and high cost of power driven dumbwaiters that have been available. Hand power dumbwaiters are inconvenient in apartment houses with any considerable number of floors and, when the buildings are equipped with modern conveniences and elevators, such dumbwaiters are entirely out of place.

One feature of the invention is the provision of a power dumbwaiter that is simple in construction and operation, and therefore cheap in initial cost and maintenance.

A second feature of the invention is the provision of a power dumbwaiter system that is constructed of a small number of standard parts.

A third feature of the invention is the provision of a power dumbwaiter system that is adaptable to serve any number of floors by the mere addition of standard equipment at each floor served.

A fourth feature of the invention is the provision of a power dumbwaiter system that is adaptable to any number of floors with a fixed minimum amount of wiring.

A fifth feature of the invention lies in the provision of a control at each floor for the dumbwaiter adapted, upon operation, to be mechanically maintained operative until reset and to be reset by the dumbwaiter car as it arrives at the floor at which the control is provided.

A sixth feature of the invention is the provision of a power dumbwaiter system in which the car may be inched downwardly so that any shelf in the dumbwaiter car may come level with the bottom of the door frame.

A seventh feature of the invention resides in the provision of a weight for a hatchway door for biasing the door to closed position, and means to obstruct the movement of the biasing weight, thereby to lock the hatchway door in closed position.

An eighth feature of the invention is the operation of the door contacts by the door weight instead of by the door proper.

A ninth feature of the invention is the provision of a limit switch which may be used as either the upper or lower limit switch by the mere rearrangement of the same standard parts on the same side of a supporting base member which is secured to the hatchway in the same manner in both instances.

Other features and advantages will become apparent from the following description and appended claims.

In the drawings:—

Figure 3 is a further enlarged sectional elevation of part of the door frame and devices therein, taken along the line 3—3 of Figure 2, with parts broken away to show details;

Figure 4 is an elevation of part of the door frame and devices therein, looking from the interior of the hatchway outwardly, with the cover plate to the floor devices removed and with certain parts broken away;

Figure 5 is a diagrammatic representation of the floor devices and car cam in various positions to show the mode of operation thereof;

Figure 6 is an elevation of the two limit switches in the hatchway, as viewed from the interior of the hatchway.

Figures 1, 2, 7:
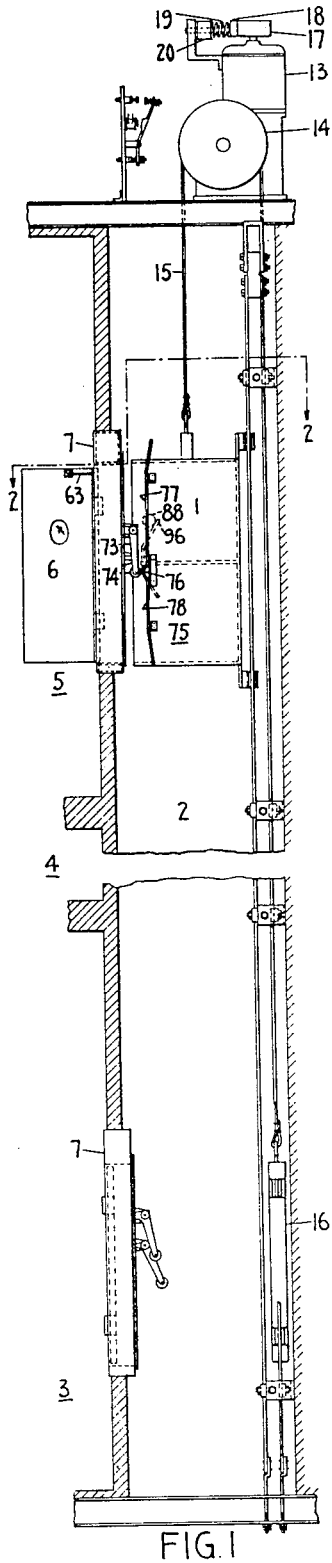
Figure 1 is a schematic illustration of the power dumbwaiter system.
Figure 2 is an enlarged section in plan of the hatchway, taken along the line 2—2 of Figure 1.
Figure 7 is a wiring diagram of the power dumbwaiter system arranged to show schematically the wiring in the hatchway.

Referring to the drawings, dumbwaiter car 1, having a shelf to divide the car into two compartments, travels in the hatchway 2 serving a number of floors of which the bottom floor 3 and the top floor 5 are shown in Figure 1. Any number of intermediate floors 4 may be served. At each floor there is a metal door 6 to permit access to the hatchway and car. Each door is hinged to a door frame 7 which is set into the hatchway wall. Contained within or secured to each door frame are all the devices to be provided at each floor, comprising, for the intermediate floors 4, a door biasing weight 8, connections therefrom to the door, a door lock 9, door contacts 10, and car control mechanism 11 including the stopping and reset devices. For each terminal floor, there is provided in addition to the above enumerated devices a limit switch 12 which is also secured to or within the door frame 7. It is thereby possible to construct a standard sized door and door frame unit which contains in itself all the apparatus for a floor. The apparatus in each floor unit may be wired at the factory, so that the time-consuming and expensive wiring on the construction job is reduced to merely connecting a few leads from each floor unit to a simple wiring system in the hatchway.

Mounted above the hatchway there is the hoisting apparatus comprising electric motor 13 which drives through suitable reduction gearing the hoisting sheave 14, over which is strung the hoisting cable 15. One end of the hoisting cable is suitably fastened to the dumbwaiter car and the other end is appropriately secured to a counterweight 16. Secured to the end of the motor shaft is a brake drum 17 against which is urged a brake shoe 18 by means of the spring 19. The brake is released by the energization of a solenoid 20 which is part of the brake mechanism.

The car control mechanism provided at each floor comprises and up switch Up and a down switch Dn. The up switch Up is operated by raising an operating member 37 of a lever 38 which pivots about pin 39. To lever 38 is secured a contact bridging strip 40. When the operating member is raised, this strip engages two contacts 41 secured to a plate 42 within the door frame. The down switch Dn is of the same construction, comprising a lever 44 with an operating member 43. The lever rotates about a pin 45 and has secured thereto contact bridging strip 46. This strip engages two contacts 47, likewise secured to plate 42, when operating member 43 is raised. Lever 38 of the up switch has an arm portion 48 integral therewith. The outer end of the arm portion is forked as at 49. Lever 44 of the down switch is similarly constructed with an arm portion 50 having a forked end 51. A rod 52 extends between the forked ends of arm portions 48 and 50 and is secured at its upper end to arm 53 of a bell crank 54. The lower end of rod 52 is secured to arm 55 of a bell crank 56. Mounted on rod 52 are two adjustable collars 57 and 58 with washers 59 and 60 resiliently supported thereon by means of springs 61 and 62 respectively. Upward movement of this rod 52, as explained later, engages washers 59 and 60 with forks 49 and 51 respectively and moves the levers 38 and 44 back into the positions illustrated in Figure 3, assuming that these levers have been operated. Stop lugs 36 are provided on levers 38 and 44 which engage with the edge of plate 42 to limit the rotation thereof.

The weight 8 for closing the door is connected to the door by cable 63 over pulleys 64 and 65 and is guided within the door frame by the square rod 66 which runs through a correspondingly shaped hole in the weight. The cable is preferably cotton covered flexible steel cable, known as launch cable, which is quite difficult to cut or break. One surface of the closing weight is beveled slightly as at 67. The arm 68 of bell crank 56 is positioned in the path of movement of the beveled portion of the weight, thus obstructing the upward movement of the weight and preventing the opening of the door. This constitutes the lock 9 for the door. When rod 52 is raised, arm 68 is removed from the path of the weight and the door is unlocked.

Two stationary contacts 70 are mounted on a contact bracket secured to plate 42. A bridging contact 69 for contacts 70 is mounted on the weight 8 and in such position as to bridge these contacts when the weight is in door closed position. When the door is opened the weight is raised and the circuit between the two contacts 70 is broken. This arrangement serves as the door contacts 10. It is of advantage in that the contacts and the operating mechanism therefor are completely enclosed in the door frame, rendering unauthorized access to them impossible, and that the number of parts is minimized.

It is to be noted in connection with the operation of the door contacts from the closing weight that if the cable connecting the door to the weight breaks or becomes unfastened at its ends, or is deliberately cut, the weight bottoms on arm 71, breaks the circuit across the door contacts, and thereby prevents any operation of the dumbwaiter. An attempt to circumvent in this manner the function of the door contacts is therefore futile.

Secured to plate 42 and projecting from the door frame into the hatchway is the plate 72, near the outer extremity of which bell crank 54 is pivoted so that its remaining arm 73 extends into the hatchway. A roller 74 is mounted on the end of this arm. The arrangement and weights of the parts secured to bell crank 54, constituting bell crank 56 with its door-locking arm 68, and rod 52 with its switch-centering collars 57 and 58, are such that normally rod 52 is in its lower position, bell crank 56 is in the door locking position, and roller 74 is at its maximum distance from the door frame. This is the position of the parts as shown in Figures 3 and 4, and is the position when the car is away from the floor, the door is closed, and neither the up switch nor the down switch has been closed.

There is secured on the side of car 1 a cam 75 with a high point at 76, upwardly from which extends a long semi-high surface 77 and downwardly from which extends another semi-high surface 78. The ends of surfaces 77 and 78 are flared off as is the practice in order to guide the engaging roller onto the cam surfaces. This car cam is arranged to engage with roller 74 on the projecting bell crank arm 73. The various positions of the devices secured to the door frame as the car cam engages with the roller are shown in Figures 5a, 5b and 5c, wherein the parts are, for simplicity, shown only diagrammatically. The numerals for the parts as used in all the diagrams of Figure 5 are the same as for the corresponding parts in the other figures.

Let it be assumed that the car is wanted at the floor at which are situated the door frame and the devices illustrated. Upon glancing through the window of the door 6, it is readily apparent whether the car is above or below this floor, for if the hoisting rope 15 is visible, the car must be below the floor, while if the hoisting rope is not visible, the car must be above the floor. In the latter case, the car must be called down, while in the former case it must be called up. Let it be further assumed that the car is below the floor, so that it is called up by closing up switch Up. In a manner to be later explained, the hoisting motor is started in the proper direction and the car ascends. Figure 5a illustrates the parts in the positions which they assume as the car approaches the floor to which it is called, the car being at such point that the flare of the cam 75 is just engaging roller 74. It is to be noted that with switch Up closed there is still a space between fork 49 and washer 59. Thus the switch remains in operated condition. Rod 52 remains in the position shown in Figures 3 and 4 to lock the door.

As the cam advances upwardly from the position shown in Figure 5a to that shown in Figure 5b, roller 74 rides up onto long cam surface 77. The resultant clockwise rotation of bell crank 54 raises rod 52 until washer 59 just engages with fork 49, and rotates bell crank 56 counterclockwise to remove the arm 68 from weight-obstructing position, thereby unlocking the door. The parts remain in substantially this position as the car continues to rise and so long as cam surface 77 passes under the roller. When the high point 76 of the cam reaches the roller and begins to pass thereunder, arm 73 is swung further to the left to further raise rod 52. As a result, washer 59, which has been engaging fork 49, rises and carries with it the arm 48, thereby rotating lever 38 to open switch Up. This causes the car to be brought to a stop, as will be seen from later description. The position of the parts at this point in the operation of the system is diagrammatically shown in Figure 5c, while the position of the car with reference to the door frame and door at this point in the operation of the system is shown in Figure 1. The door may now be opened, which operation, as a result of raising weight 8, opens door contacts 10 to prevent further operation of the car.

It is to be noted in this connection that the arrangement of the door hinges, weight pulley 65 and cable fastener on the door is such that when the door is swung all the way back the door remains open, but in all other positions of the door the weight closes the door and renders the system operative by closing the door contacts.

Referring to Figure 1, it may be seen that the car is stopped level with the sill of the door frame. Frequently, however, heavy or unwieldy loads such as ice, laundry or boxes of groceries are placed upon the shelf of the car. It is exceedingly difficult to remove such loads as they are above the ordinary level of lifting, and this difficulty is the more pronounced in apartment houses where the dumbwaiters are used almost exclusively by women. The difficulty disappears when the shelf on which the load rests is lowered to the level of the door sill. This may be done by first closing door 6 to complete the circuit through the door contacts. The position of the parts is then as shown diagrammatically in Figure 5c. Down switch $Dn$ is then closed by raising up on operating member 43. As fork 51 of this switch is in engagement with washer 60, which, by reason of roller 74 engaging the high point of car cam 75, is at its uppermost position, the only way by which switch $Dn$ may be closed is by compressing the spring 62, as shown in Figure 5d. The switch must be held up in the closed position until the motor has started and lowered the car so that roller 74 rides on long cam surface 77. When the car has lowered sufficiently, the $Dn$ switch is opened, and the car stops with its shelf level with the sill of the door frame. The parts in this position are shown in Figure 5e. It is to be noted that the door remains unlocked while the car is in this position. Hence the door may be opened and the circuit through the door contacts broken.

At each terminal floor is provided a limit switch 12 enclosed within the door frame for the terminal floor but on the side thereof opposite the side mounting the car controlling mechanism 11. This is best shown in Figure 2. Referring to Figure 6, the upper limit switch LU comprises a base 80, secured to the door frame, on which are two bosses 81 and 82, two drilled lugs 83 and 84, and the portion 85 projecting into the shaftway. Rotatably mounted at the outer end of projecting portion 85 is a bell crank 86 which may be of the same construction as bell crank 54. A roller 88 is secured to arm 87 of the bell crank. A rod 90 is secured to the other arm 89 of the bell crank, this rod being arranged to slide through the hole in lug 84. A compression spring 92 is arranged on the rod between lug 84 and its connecting link, to bias the bell crank for clockwise movement. Stop nuts 91 are provided on the rod to limit its upward motion. The fixed contacts 93 of this limit switch are secured to boss 81, while the movable bridging contact 94 is secured to a boss 95 on the crank arm 89. The bridge is normally maintained in engagement with the fixed contacts 93 by spring 92. When the car rises above the door frame of the upper terminal floor, car cam 96 engages with roller 88, rotates the bell crank counterclockwise and separates the bridge from the fixed contacts of the limit switch.

The lower limit switch LL is made of parts exactly similar to those parts constituting switch LU, but they are arranged on the base in a slightly different manner. The same reference numerals are employed for the corresponding parts of switch LL, but these numerals are primed for distinguishing purposes. Although base 80' is secured to the door frame in the same place and in the same manner as base 80, bell crank 86' is mounted in a reverse manner on end portion 85'. Hence rod 90 slides through the hole in lug 83'. Fixed contacts 93' are mounted on boss 82' with each contact rotated half a revolution about the axis of its supporting bolt so that fixed contacts 93' and the bridge 94' are normally in engagement. When the car descends over half a car height below the door frame of the lower terminal floor, car cam 97 engages with roller 88', rotates the bell crank clockwise, and separates the bridge from the fixed contacts of the limit switch.

By this construction the limit switches may be assembled on similarly mounted bases and the mechanism be made to function in the same manner irrespective of whether the operating mechanism therefor causes clockwise or counterclockwise rotation of the switch arm. This is a saving in the number of limit switch parts and permits the use of identical terminal floor mountings for the limit switches.

The system is wired as shown in Figure 7, wherein a three-phase alternating current power supply with leads I, II and III is illustrated. The motor 13 is connected to the power supply either by the closing of contacts U101 and U102 or by the closing of contacts D111 and D112. The former contacts are engaged upon the energization of coil U104 of the up direction electromagnetic switch whereupon the motor operates in a direction to raise the car. The latter contacts are engaged upon the energization of coil D114 of the down direction electromagnetic switch, whereupon the motor operates in a direction to lower the car. The direction switches have auxiliary contacts U103 and D113 connected in the circuits of the actuating coils U104 and D114 and serve as electrical interlocks. In series with one phase of the motor there is connected the solenoid 20 of the brake mechanism. It is thereby energized simultaneously with the energization of the motor to release the brake.

As the motor and the electromagnetic switches are ordinarily in the penthouse over the shaftway, all the wiring in Figure 7 that appears to the left of the vertical dot-and-dash line X—Y is in the penthouse.

Considering the wiring that appears to the right of the line X—Y, all the up and the down switches $Up$ and $Dn$ are connected to a common wire E which extends the length of the shaftway. Another wire A, also extending the length of the shaftway, connects at the bottom thereof to the common wire E, and at the top thereof to a power lead, as phase III. Interposed in series in the lead A are the door contacts 10 for each floor. In order, therefore, to make the common wire E, and consequently the switches, "alive", all the door contacts must be closed to render a complete circuit for the A wire.

The other side of each of the up switches is joined to common lead C which extends the length of the shaftway, passes through the contacts of the upper limit switch LU, and connects with the actuating coil U104 of the up direction switch. The other side of each of the down switches is joined to a common lead D extending the length of the shaftway, at the bottom end of which connects the lead B, which, after passing through the contacts of the lower limit switch LL, extends up the height of the shaftway and connects with the actuating coil D114 of the down direction switch.

It is thus apparent that the wiring in the shaftway consists of only five wires, A, B, C, D and E, extending the length thereof, and to which at each floor only a few simple connections are made. It is to be also noted that this same simple wiring is used regardless of the number of floors the car serves, which permits standardized construction. For example, if the whole floor 4 that is diagrammatically bounded by the letters PQRS in Figure 7 is taken out, and the corresponding sections of the A, B, C, D and E wires rejoined, the system operates in precisely the same manner as it did before the floor was removed. Similarly, as many floors as desired may be included between the space bounded by the letters PQRS and the apparatus at each floor connected to the five shaftway wires without otherwise changing the construction or operation of the system.

The shaftway wiring may therefore be reduced to installing a single conduit down the shaftway from the penthouse with outlet boxes at each floor, connecting the apparatus in each door frame to the shaftway circuits similarly and in a standard manner at the corresponding outlet box, connecting in the limit switches at the terminal floors, and joining the two wires A and E at the lower terminal. This may be done by less skilled labor than heretofore employed for wiring elevator installations, and the time required is considerably reduced.

Assume that it is desired to call the car to the third floor and that the car is positioned at the lower terminal. Accordingly, the operating member 38 of the up switch for the third floor is raised, closing the switch which is thereafter retained in operated condition as previously described. Assuming that all door contacts are in engagement, this completes a circuit for coil U104 of the up direction switch from phase III through wires A, E and C, limit switch LU, coil U104 and interlock contacts D113 to phase I. The up direction switch engages contacts U101 and U102 to complete the circuit for the phase windings of the hoisting motor 13 and the brake release solenoid 20. As a result, the brake releases and the motor starts the car in the up direction.

As the car nears the third floor, the car cam engages roller 74 of bell crank 54 for that floor, moving it sufficiently about its pivot to effect movement of bell crank 56 into position to unlock the door. Upon further movement of the car, the peak of the car cam engages the roller, causing the up switch to be restored to off position. This breaks the circuit for the actuating coil of the up direction switch, deenergizing the hoisting motor and permitting the application of the brake to bring the car to a stop.

The car may be called to any of the other floors from a lower floor in a similar manner by operating the up switches at such other floors.

If the car is above the floor at which it is desired to use the car, the down switch at the floor is closed instead of the up switch. This completes a circuit from phase III through wires A and E as before, wires D and B, limit switch LL, coil D114 of the down direction switch and interlock contacts U103 to phase I. The down direction switch engages contacts D111 and D112, completing the circuit for the phase windings of the hoisting motor and for the brake release solenoid. The circuits for the hoisting motor are reversed, thus causing the starting of the car in the down direction. As the car nears the calling floor, the car cam engages the roller of bell crank 54 for that floor, unlocking the door. Upon the peak of the cam engaging the roller, the down switch is reset, causing the car to be brought to a stop.

The door being unlocked, it may be opened as the car arrives at the calling floor. Assume, for example, that it is desired to send a package to the lower terminal. The package is placed in the car and the door closed. By giving a signal, at the lower terminal, as by pressing a button to complete a circuit for a buzzer at the lower terminal, or by telephonic communication, the janitor or other person at the lower terminal is advised that the user of the car desires to have it called to the lower terminal. To effect this operation, the person at the lower terminal closes the down switch at that floor, whereupon the car is started in the down direction. Upon its arrival at the lower terminal, it is brought to a stop. The car may be sent from the floor at which it is positioned to the lower terminal by holding the down switch at that floor in operated position until the car cam leaves the operating roller. In such event the car is stopped by the lower limit switch. In the event that more than one switch is operated, the car runs to the farthest floor of those at which switches are operated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In an elevator system, a hatchway door, weighted means for biasing said door to closed position, means connecting said weighted means to said door, and circuit controlling means, part on said weighted means and part mounted in a fixed position, the position of the latter being such that the circuit controlling means is in one circuit controlling condition when the weighted means is in door closed position and in another circuit controlling condition both when the weighted means is moved out of door closed position in the opening of the door and when the weighted means becomes disconnected from the door.

2. In an elevator installation, a hatchway door, a housing, a weight guided for up and down movement in said housing, means connecting said weight to said door so that the weight normally occupies a definite position when the door is closed, said weight being lifted by the door during the door opening operation and, upon the release of the door, lowering to return the door to closed position, and circuit controlling means, part on said weight and part stationary in said housing, said circuit controlling means being in circuit closed condition when said weight is in said definite position and in circuit open condition when said weight is either above or below such position.

3. In an elevator installation, a hatchway door, hinge means supporting said door for swinging movement, a frame for said door, a weight for said door arranged within said frame, said frame being constructed to form a housing for said weight, a cable connecting said weight to said door in such manner that the weight biases said door to closed position, a contact secured to said weight to be moved therewith, and a pair of stationary contacts positioned to be bridged by said movable contact when said weight is in door closed position, said weight disengaging said movable contact from said stationary contacts when said door is moved from closed position, said frame being constructed to permit movement of said weight into position to disengage said movable contact from said stationary contacts upon disconnection of said counterweight from said door.

4. In combination with a hatchway door, a member, a cable suspending said member, means connecting said cable to said door to raise said member upon the opening of the door, and means to prevent the raising of said suspended member and thus prevent the opening of the door.

5. In an elevator installation in which the elevator car serves a plurality of floors, a hatchway door at one of said floors, a weight for said door, flexible means connecting said weight to said door in such manner that the counterweight biases said door to closed position, a movable member positioned normally to obstruct movement of said weight in the door opening direction, thereby locking said door in closed position, and means operable as the car arrives at said floor to move said member into position to free said weight for movement in the door opening direction, thereby unlocking said door.

6. In an elevator installation in which the elevator car serves a plurality of floors, a hatchway door at one of said floors, hinge means supporting said door for swinging movement, a weight for said door, flexible means connecting said weight to said door in such manner that the weight biases said door to closed position, a pivoted lock member, means biasing said lock member about its pivot to a position to obstruct movement of said weight in the door opening direction, thereby locking said door in closed position, a lever having an operating roller extending into the hatchway, a cam carried by the car and positioned to engage said roller as the car arrives at said floor to move said lever, and means connecting said lever to said lock member to effect movement of the lock member, upon movement of said lever by said cam, into position to free said weight for movement in the door opening direction, thereby unlocking said door.

7. In a dumbwaiter system with a car having a bottom shelf and an upper shelf, the combination of a hatchway door frame, a hatchway door supported thereby, a weight contained in said door frame, the downward movement of said weight causing said door to close, door locking means comprising means to prevent the upward movement of said weight, and means to render ineffective said motion preventing means when either of said shelves is level with the sill of said hatchway door frame.

8. In a dumbwaiter system with a car having a plurality of shelves, the combination of a hatchway door, a member suspended by a cable, means connecting said cable to said door to raise said member upon the opening of the door, door locking means to prevent the opening of said door comprising a latch member adapted to normally obstruct the upward movement of the suspended member, and means to move said latch member from the obstructing position when any one of said shelves is level with the bottom of said shaftway door.

9. In an elevator system, a hatchway door, a weighted member, a cable suspending said member, means connecting said cable to said door to raise said member upon the opening of the door, door locking means comprising means to obstruct the upward motion of said member, a door contact switch including a stationary contact and a movable contact, means to secure said movable contact upon said weighted member so that the contacts are engaged when the member is in the lower door closed position, and means operable upon the arrival of the elevator car at the hatchway door to remove said obstructing means from the upward path of said suspended member so that the door may be opened and thereby disengage said door switch contacts.

10. In an electric-power-operated dumbwaiter system serving more than two floors, the combination of hand-operated switches at each floor to control the up and down movements of the dumbwaiter car, said switches remaining in the positions to which they are moved upon the hand operation thereof, a cam secured to the dumbwaiter car, and means at each floor operable by said car cam upon the arrival of the car at such floor to automatically and mechanically reset all of said hand-operated switches at such floor to off position.

11. In an electric-power-operated dumbwaiter system serving more than two floors, the combination of a plurality of up controls and a plurality of down controls for the dumbwaiter car, one up control and one down control being positioned at each floor, and each control being mechanically self-maintaining when operated, and means carried by the car to reset to neutral both controls at each floor when the car is opposite the corresponding floor.

12. In an elevator system, an elevator car, a floor served by the car, a control at said floor operable to call the car to said floor, said control, upon operation, remaining in operated position, a door at said floor, means for locking said door, means at said floor common to said control and said locking means operable to release said locking means to unlock the door and to restore said control to off position to cause the stopping of the car, and means carried by the car for causing operation of said common means as the car arrives at said floor.

13. In an elevator system, an elevator car, a floor served by said car, an up switch at said floor operable to cause movement of the car in the up direction and a down switch at said floor operable to cause movement of the car in the down direction whereby the car may be brought to said floor from another point in the hatchway, each of said switches, upon operation, being self-maintained in operated position, and means common to said switches operable by car movement to restore either or both of them to off position upon arrival of said car from either direction at said floor.

14. In an elevator system, an elevator car, a floor served by said car, a manually operable up control at said floor operable to cause movement of the car in the up direction to bring it to said floor from below, a manually operable down control at said floor operable to cause movement of the car in the down direction to bring it to said floor from above, each of said controls, upon release thereof after being operated, remaining in operated position, and means operable by car movement to restore either or both of said controls to off position upon arrival of said car from either direction at said floor, said controls being manually operable against the action of said restoring means to inch the car into the desired position with respect to said floor.

15. In an elevator system, an elevator car, a floor served by said car, hoisting mechanism for the car, a circuit for causing operation of said mechanism to move the car in the up direction, another circuit for causing operation of said mechanism to move the car in the down direction, an up switch at said floor operable to complete the first named circuit and a down switch at said floor operable to complete the second named circuit, thereby enabling the car to be brought to said floor from any other point in the hatchway, each of said switches being adapted, upon operation, to remain in operated position, interlocking means to render one of said switches ineffective when both of them are in operated position, means common to said switches operable to restore them to off position, and means carried by the car for causing operation of said restoring means, upon arrival of said car from either direction at said floor, to return either or both of said switches to off position, thereby stopping the car, each of said switches being operable against the action of said restoring means to complete the circuit controlled thereby for the purpose of inching the car into the desired position with respect to said floor.

EDWARD LEE DUNN.